United States Patent [19]

Reynolds

[11] Patent Number: 5,606,797
[45] Date of Patent: Mar. 4, 1997

[54] PROCESS TO RESTORE AND REFURBISH TURBOCHARGER HOUSING

[76] Inventor: Russell B. Reynolds, 10611 E. 30th St., Tulsa, Okla. 74129

[21] Appl. No.: 494,368

[22] Filed: Jun. 26, 1995

[51] Int. Cl.⁶ .................................................. B23P 15/00
[52] U.S. Cl. ..................................... 29/889.1; 29/402.08
[58] Field of Search ............................ 29/889.1, 889.5, 29/889, 402.08, 402.19, 402.03, 402.06; 228/119

[56] References Cited

U.S. PATENT DOCUMENTS

| | | |
|---|---|---|
| 4,028,788 | 6/1977 | DeMusis . |
| 4,621,762 | 11/1986 | Bronowski . |
| 4,893,388 | 1/1990 | Amos et al. ........................... 29/889.1 |
| 4,967,458 | 11/1990 | Rosenberg . |
| 5,012,800 | 5/1991 | Lopes . |
| 5,152,058 | 10/1992 | Legros ...................................... 29/889 |
| 5,172,475 | 12/1992 | Amos et al. .......................... 29/402.08 |
| 5,183,390 | 2/1993 | Amos ....................................... 416/224 |
| 5,197,191 | 3/1993 | Dunkman et al. .................... 29/402.19 |
| 5,205,465 | 4/1993 | Bogard et al. ............................ 228/119 |

Primary Examiner—Irene Cuda
Attorney, Agent, or Firm—Head, Johnson & Kachigian

[57] ABSTRACT

A process to restore and refurbish a turbocharger housing having a gasket seal surface, an alignment ring, a cylindrical seal bore and a seal bore face. The process includes the steps of machining off the gasket seal surface, the alignment ring and the seal bore face and machining out the diameter of the seal bore. The gasket surface, the alignment ring, the seal bore face and the seal bore are built up in excess of finished dimensions by welding. The gasket surface, alignment ring, flanges, seal bore face and seal bore are thereafter machined to their finished dimensions.

11 Claims, 3 Drawing Sheets

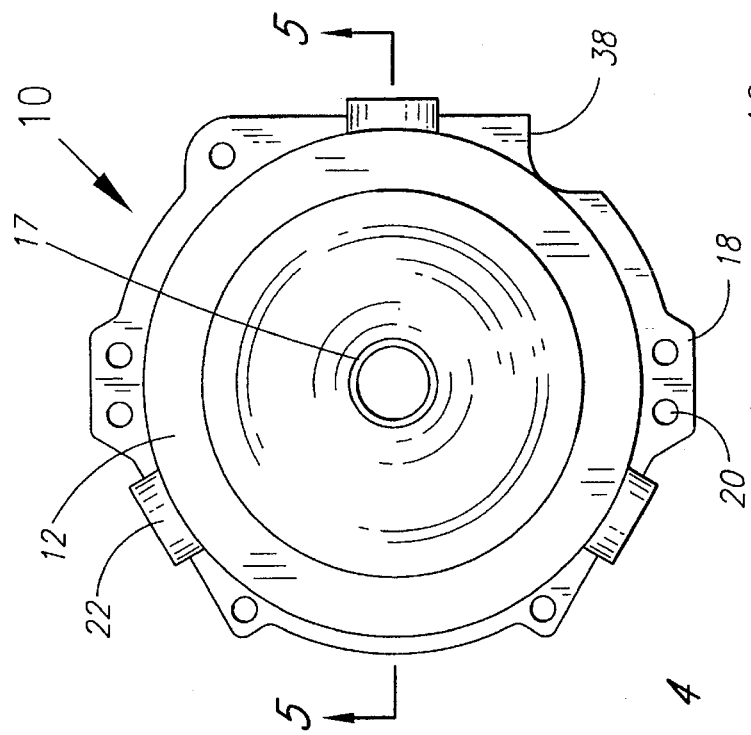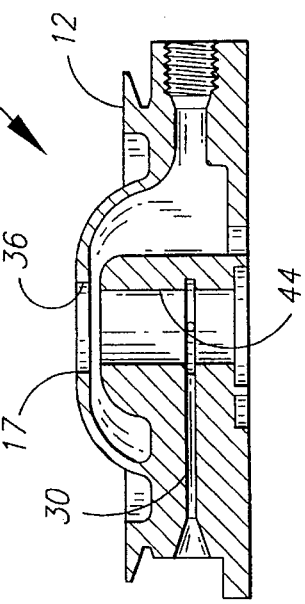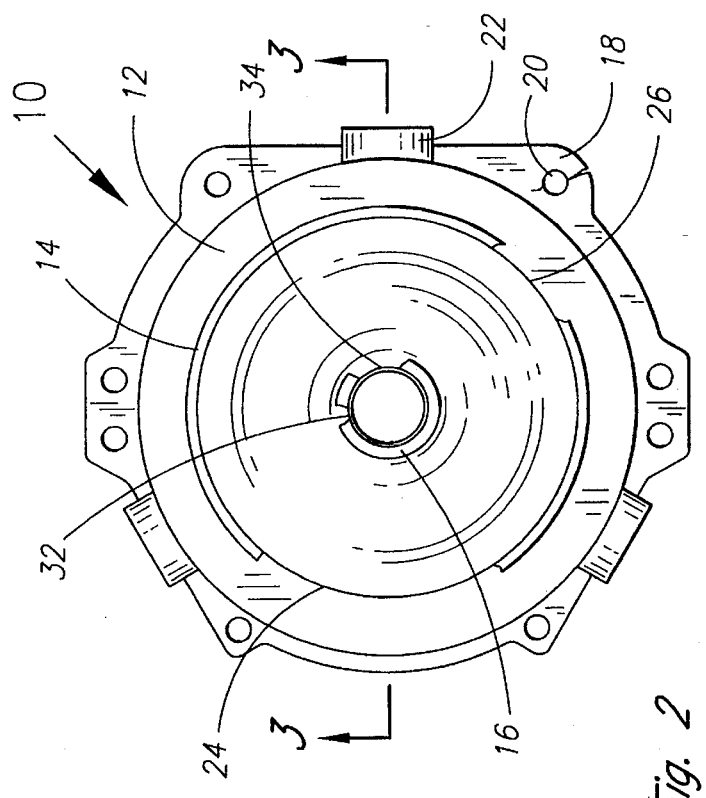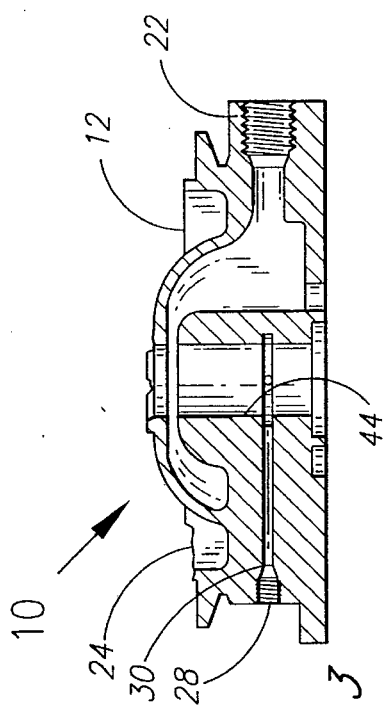
Fig. 2
Fig. 3
Fig. 4
Fig. 5

5,606,797

PROCESS TO RESTORE AND REFURBISH TURBOCHARGER HOUSING

BACKGROUND OF THE INVENTION

1. Field of the Invention

The present invention is directed to a process to restore and refurbish a turbocharger which has been subjected to corrosion, pitting or breakage from use. In particular, the present invention is directed to a process to restore and refurbish a turbocharger housing to the original finished dimensions.

2. Prior Art

Turbochargers or superchargers are known accessories to internal combustion engines. A turbocharger is driven by the engine exhaust gas to increase or boost the amount of fuel that can be burned in a cylinder, thereby increasing engine power and performance. In an aircraft engine, a turbocharger serves an additional purpose. The engine can retain its sea-level power rating at high altitudes despite a decrease in atmospheric pressure. Engine power varies with the pressure of the air entering the cylinders. Since the pressure decreases with altitude, the maximum horsepower is at sea level. For example, at an altitude of 5000 feet, the engine would deliver 85 percent power.

The turbocharger includes a center or bearing housing which supports a connecting shaft for the turbocharger. The center housing, which is often fabricated of cast aluminum, fits on an exhaust housing. The turbocharger, including its center or bearing housing, is subject to corrosion, pitting, wear and breakage from use.

Typically, after corrosion, pitting, wear or breakage, the turbocharger housing is removed and simply replaced.

Additionally, in the case of aircraft engines, because of manufacturer standards and government regulations, the turbocharger must be dismantled and inspected after a number of hours of use. As an example, it may be required to dismantle and inspect the turbocharger every 500–1800 hours of use. Once the center housing has been removed, it is difficult to align and create a good seal.

Known procedures have been used in the past to repair crank cases, cylinders or other elements of internal combustion engines. While cleaning and welding procedures are used therein, the surfaces are ground down to a new surface, which is not the original dimension.

Nowhere is it known to both grind or machine down a worn surface or surfaces and then rebuild those surfaces to their original dimensions.

It is, therefore, a principal object and purpose of the present invention to provide a process to restore and refurbish a turbocharger housing by machining selected areas, building up the selected areas in excess of finished dimensions and machining to finished dimensions.

SUMMARY OF THE INVENTION

The present invention is directed to a process to restore and refurbish a turbocharger center or bearing housing.

The center housing includes a flat, circular seal surface which mates with an exhaust housing of the turbocharger. The center housing also includes an alignment ring concentric with the gasket seal surface and extending vertically therefrom. A seal bore, aligned with the bearing bore of the housing, is substantially cylindrical and concentric with the seal surface and alignment ring. A plurality of extending flanges have openings to receive fasteners therethrough. A series of threaded lubricant passages extend radially from the center of the housing and terminate in internally threaded openings.

The process of the present invention begins with removal of the housing from the turbocharger. After the center housing is removed from the engine, any and all plugs in the oil passages are removed as well as O-rings or gaskets. Oil residue and grease is removed by application of a liquid solution. Carbon and other foreign debris is removed by blasting with a glass bead media.

Using a lathe, the gasket seal surface and the entire alignment ring is machined off. The face of the seal bore is machined down and the seal bore diameter is also cut out to enlarge the diameter. Any surface cracks in the center housing are also identified. After preheating the housing, the welding process is performed. The area at the seal bore and the seal bore face is built up and the area at the gasket seal surface in the alignment ring is built up with welding material.

Any broken or damaged flanges or cracked areas are subjected to a grinding process so the broken or damaged areas are removed. Any damaged flange areas or lubricant ports are thereafter built up with weld material.

After all welding is completed, the housing is heated for stress relief. All of the surfaces of the housing that have been subjected to the welding are machined close to their finished dimensions. The center housing is removed from the lathe machine and a further blasting process is applied to clean the housing. Finally, the center housing is subjected to a second machining process to be machined to finished dimensions.

BRIEF DESCRIPTION OF THE DRAWINGS

FIG. 2 is a top view of a turbocharger housing after use showing indications of corrosion, pitting and wear;

FIG. 3 is a perspective view taken along section line 3—3 of FIG. 2;

FIG. 4 is a top view of a turbocharger housing which has been subjected to the initial machining and grinding operations;

FIG. 5 is a sectional view taken along section line 5—5 of FIG. 4;

DETAILED DESCRIPTION OF THE PREFERRED EMBODIMENTS

Figure 1:
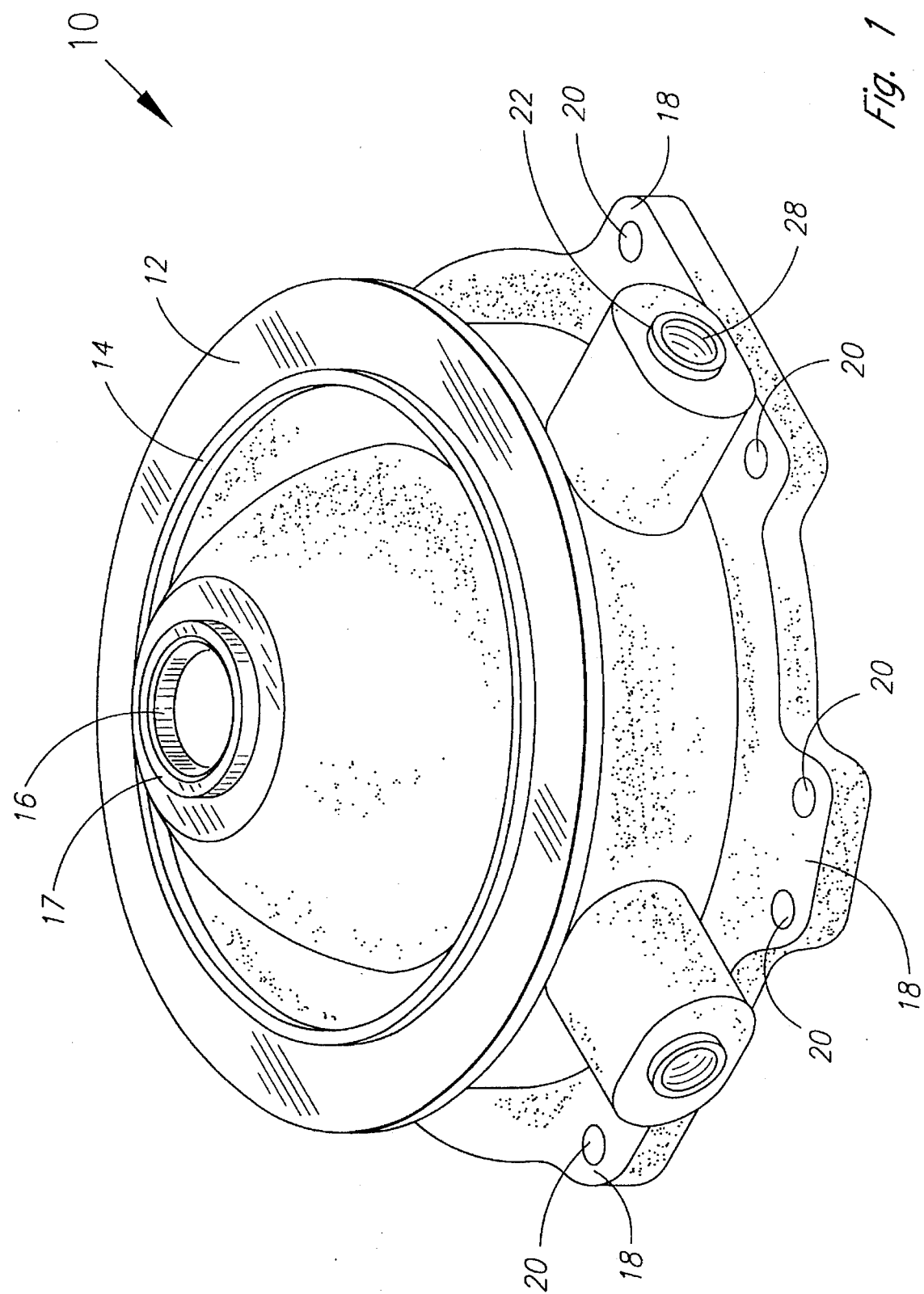
FIG. 1 is a perspective view of a turbocharger center or bearing housing which has been subjected to the process of the present invention to restore and refurbish the housing.

Referring to the drawings in detail, FIG. 1 illustrates a perspective view of a turbocharger center or bearing housing 10 which has been put through and subjected to the process of the present invention so that the turbocharger housing is restored and refurbished.

The center housing 10 includes a flat, circular gasket seal surface 12 which mates with an exhaust housing (not shown) of the turbocharger. The center housing 10 also includes an alignment ring 14 which is concentric with the seal surface and extends vertically therefrom. A seal bore 16 is substantially cylindrical and is concentric with the seal surface and alignment ring 14. A bearing bore (not visible in FIG. 1) is aligned with the seal bore to receive the shaft. The seal bore terminates at a seal bore face 17 which is substantially parallel to the gasket seal surface 12.

A plurality of extending flanges 18 are provided with openings 20 therethrough to receive fasteners (not shown) therethrough. A series of threaded lubricant passages such as at 22 extend radially from the center of the housing. The threaded lubricant passages terminate in internally threaded openings 28. Engine coolant or other lubricant is circulated through the housing 10 to aid in cooling. The turbocharger housing 10 may be constructed of various materials but is often constructed of an aluminum composition which resists oxidation.

FIGS. 2 and 3 illustrate a center or bearing housing 10 which has been removed from a turbocharger after considerable use. It will be observed that the alignment ring 14 is broken or chipped away at various places such as at reference numerals 24 and 26. The threads 28 of the small lubricant passage 30 have been stripped.

One of the flanges 18 is cracked at the opening 20. Additionally, the seal bore 16 is chipped at 32 and 34.

The process consists of a number of discrete steps. Initially, the center housing is removed from the turbocharger and any and all plugs in the oil passages are removed as well as any O-rings or gaskets that may be on the center housing 10. Any oil residue and grease is removed by application of a liquid solution. One such degreasing solution is marketed under the brand name "Safety Clean".

Once the housing 10 has been degreased, the housing is cleaned. The bearing bore 44 (visible in FIG. 3) and the seal bore are plugged with a plastic plug or plugs (not seen in FIGS. 2 or 3). Thereafter, carbon and other foreign debris on the center housing are removed by blasting with a glass bead media. This is performed in a closed chamber.

Thereafter, the bearing bore dimensions are checked to see if they are still within the manufacturer's tolerance. If the bearing bore 44 is not within the manufacturer's tolerance, the center housing 10 may not be restored and is rejected. If, however, the bearing bore 44 is within the permitted tolerance, a visual inspection is performed to see if there are any damaged areas such as cracks adjacent to bolt holes around the flange area or heavy corrosion of material adjacent to the seal bore or alignment ring surfaces.

FIGS. 4 and 5 illustrate the results of the next steps in the process.

Using a lathe, the existing gasket seal surface 12 is machined off and the entire alignment ring 14 is cut off at the same time. All wear, pitting and erosion indications are thereby removed. In one procedure, approximately 0.02 inch of material is removed from the gasket seal surface 12. The gasket seal surface 12 is machined down to clean up any cracks, damage or corrosion pits. The face 17 of the seal bore 16 is machined down approximately 0.07 inch so that the area will be flat with the adjacent area. The seal bore diameter 36 is also cut out to enlarge the diameter from between 0.01 inch to approximately 0.3 inch.

The center housing 10 is thereafter visually inspected for cracks. This may be assisted by using a liquid penetrant such as a dye check aerosol spray. After application of the spray, the cracks become more visible.

The welding process may be performed in two steps. The center housing 10 is thereafter placed into an oven (not shown) or other heater and preheated to approximately 400° Fahrenheit as determined with a surface thermometer or temperature stick. While still warm (at least 350° F.), the center housing 10 is removed and a steel plug is installed in the bearing bore 44 to protect it from any high frequency or arc damage. The center housing 10 is then bolted onto a flat steel plate to prevent any warpage during the welding.

Thereafter, a first welding process is performed while the center housing remains at least 350° F. A welding machine using argon gas as a shield may be used. Buildup of weld material in excess of the original dimensions is accomplished by using ⅛ inch No. 4008 aluminum rods. The area in the seal bore and at the seal bore face 17 is built up and the area at the gasket seal surface 12 and alignment ring 14 is built up. The center housing 10 may then be removed from the flat plate.

The broken or damaged flange and the lubricant port is thereafter repaired. The flange area is ground out with a hand-held grinder so that no cracked areas remain as seen at reference numeral 38. The threads 28 of the lubricant passage 30 are ground out to a wider diameter. As best seen in FIG. 5, a frusto-conical opening results. Any surface cracks in the housing are also subjected to the grinding process for removal.

Figure 6:
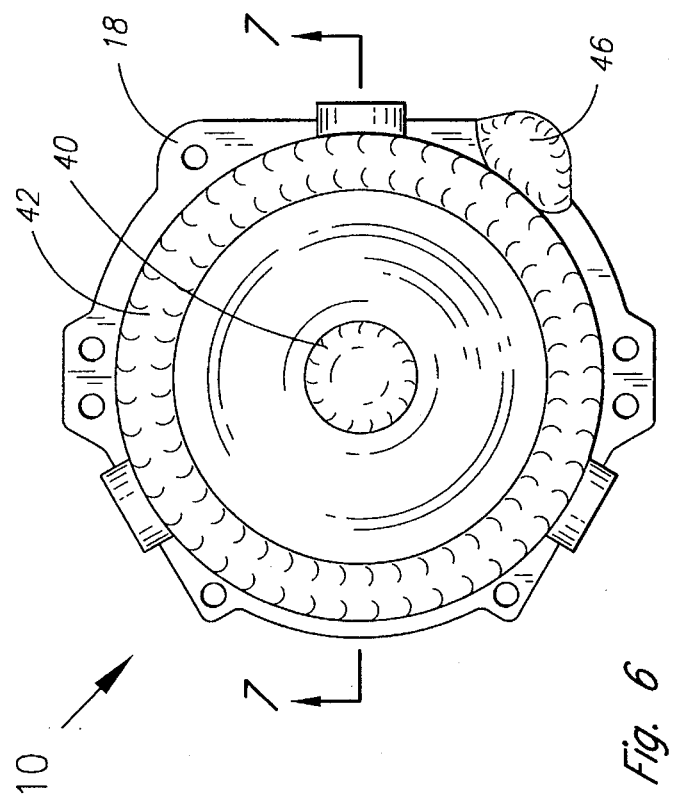
FIG. 6 is a top view of the turbocharger housing shown in FIGS. 2–5 after completion of the welding processes.
Figure 7:
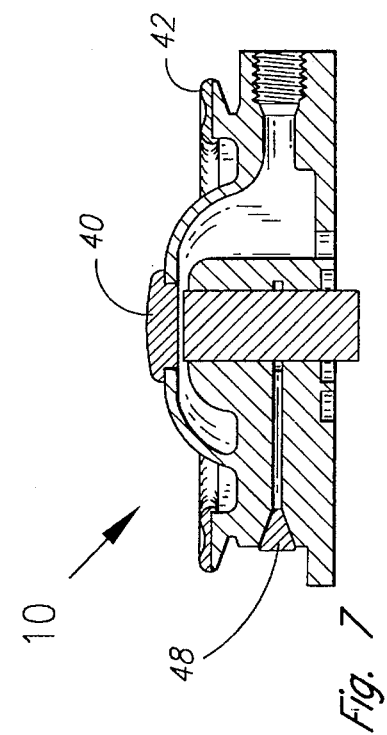
FIG. 7 is a sectional view taken along section line 7—7 of FIG. 6.

Thereafter, those areas are built up with weld material in excess of the original and finished dimensions. FIGS. 6 and 7 show the result of the welding that has been performed on the center housing 10.

The entire seal bore 16 has been filled with weld material 40. The entire gasket seal surface and alignment ring area has been built up with weld material 42. Additionally, the flange area 38 is built up with weld material 46. Finally, the area which contained the threads 28 is filled with weld material.

After all welding is completed, the center housing 10 is baked in an industrial oven at approximately 400° Fahrenheit for four hours for stress relief. It is then removed from the oven and allowed to cool in ambient atmosphere until it reaches a maximum of 100° Fahrenheit.

The center housing 10 is thereafter placed on a lathe for initial machining. The base with flanges 18 and the bearing bore 38 are used for alignment. All of the surfaces that have been welded are thereafter machined to within approximately 0.01 inch of the finished dimensions. The finished dimensions will be the original dimensions specified.

The center housing is thereafter removed from the lathe machine. The seal bore 16 and the bearing bore are then plugged with plastic plugs. The center housing is then reintroduced to the blasting process. The center housing is placed in a closed chamber and subjected to blasting with glass bead media.

After the second blasting, the housing is cleaned of all media by using an air blower. The centering housing is then subjected to a second machining process to be machined to its finished dimensions.

The center housing 10 is placed back on the lathe and the housing is machined to within tolerance of finished dimensions. Finally, the junction of the seal bore 16 and the seal bore face 17 is chamfered at approximately 30° as may be seen in FIG. 9.

The bearing bore 44 and seal bore are subjected to a final polish with a hand-held grinder being careful not to enlarge the bores.

Thereafter, the center housing 10 may be washed with a solvent and all remaining debris removed.

As a final step, the center housing 10 may be washed in hot water and a corrosion protection solution may be applied in order to anodize the center housing.

It has been found that the weld materials and welded areas are stronger than the original housing.

Figure 8:
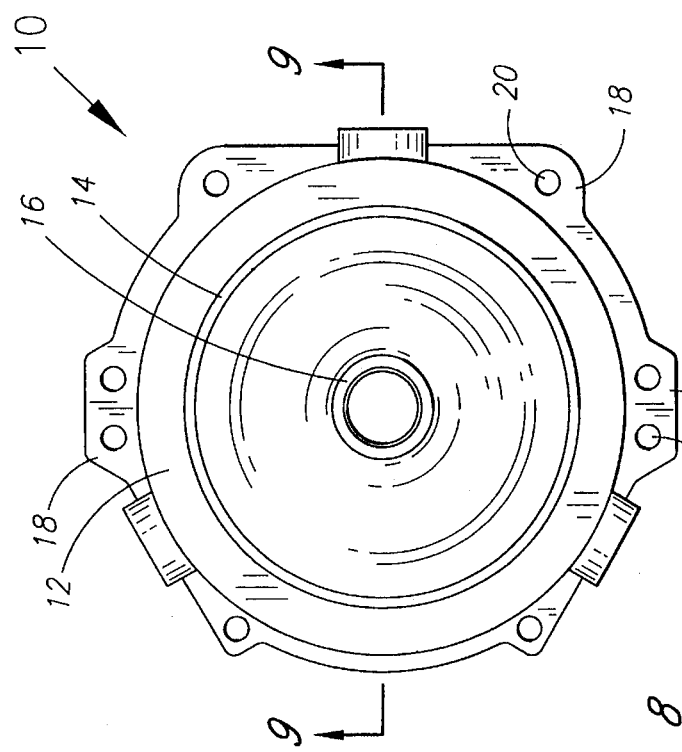
FIG. 8 is a top view of the center housing shown in FIGS. 2–7 after completion of the restoration and refurbishing process.
Figure 9:
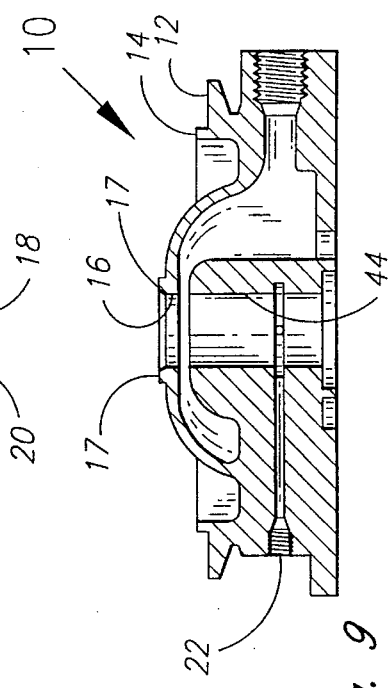
FIG. 9 is a sectional view taken along section line 9—9 of FIG. 8.

FIGS. 8 and 9 show the center housing 10 after completion of the process of the present invention.

In an alternate procedure, after the housing is degreased and cleaned, the alignment ring 14 may be entirely ground off along with the seal surface 12. A new metal alignment ring (not shown) may then be inserted on the housing 10 and affixed to the gasket surface by welding material.

Similarly, the seal bore may be ground out to enlarge the diameter and a new metal plug or ring may be inserted and affixed to the housing by welding. The remaining steps of the process are similar to those discussed above.

Whereas, the present invention has been described in relation to the drawings attached hereto, it should be understood that other and further modifications, apart from those shown or suggested herein, may be made within the spirit and scope of this invention.

What is claimed is:

1. A process to restore and refurbish a turbocharger housing, which process comprises:

machining off selected surfaces of said turbocharger housing;

building up said selected surfaces of said housing in excess of finished dimensions by welding; and machining said selected surfaces of said housing to their finished dimensions.

2. A process to restore and refurbish a turbocharger housing as set forth in claim 1 wherein said selected surfaces include a gasket seal surface, an alignment ring, a cylindrical seal bore and a seal face.

3. A process to restore and refurbish a turbocharger housing as set forth in claim 1 including the additional steps of grinding off any broken or cracked flanges on said housing and building up each said flange in excess of finished dimensions.

4. A process to restore and refurbish a turbocharger housing having a gasket seal surface, an alignment ring, a cylindrical seal bore, a seal face and a plurality of flanges, which process comprises:

machining off said gasket surface and said alignment ring of said turbocharger and machining out said seal bore face and the diameter of the seal bore;

building up said gasket surface, said alignment ring, and said seal bore face and diameter in excess of finished dimensions by welding;

grinding off any broken or cracked flanges on said housing;

building up each said flange by welding in excess of finished dimensions; and machining said gasket surface, said alignment ring, said flanges, said seal bore and said seal bore face to their finished dimensions.

5. A process to restore and refurbish a turbocharger housing as set forth in claim 4 including the additional steps of machining out lubricant passages in said housing, building up said lubricant passes in said housing by welding and machining said lubricant passages to finished dimensions.

6. A process to restore and refurbish a turbocharger housing as set forth in claim 4 including the additional, initial steps of:

cleaning said housing with a liquid solution to remove oil and grease residue; and removing carbon and other debris by blasting said housing with glass bead media.

7. A process to restore and refurbish a turbocharger housing as set forth in claim 4 including the additional step of inserting a plug in a bearing bore of said housing prior to said welding steps.

8. A process to restore and refurbish a turbocharger housing as set forth in claim 4 including the additional step of chamfering said seal bore after said machining of said seal bore and seal bore face.

9. A process to restore and refurbish a turbocharger housing as set forth in claim 4 including the additional step of applying a liquid die penetrant to said housing to identify cracks therein prior to welding.

10. A process to restore and refurbish a turbocharger housing as set forth in claim 4 wherein said machining to finished dimensions is accomplished in two steps as follows:

machining a first time to near the finished dimension;

blasting with media to clean said housing; and machining a second time to the finished dimension.

11. A process to restore and refurbish a turbocharger housing as set forth in claim 4 including the additional step of preheating said housing prior to each welding step.

* * * * *